US010586970B2

(12) United States Patent
Sugiyama et al.

(10) Patent No.: US 10,586,970 B2
(45) Date of Patent: Mar. 10, 2020

(54) WIRING MODULE

(71) Applicant: YAZAKI CORPORATION, Tokyo (JP)

(72) Inventors: Kazuto Sugiyama, Shizuoka (JP); Masahide Tsuru, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 233 days.

(21) Appl. No.: 15/175,349

(22) Filed: Jun. 7, 2016

(65) Prior Publication Data

US 2016/0365562 A1  Dec. 15, 2016

(30) Foreign Application Priority Data

Jun. 10, 2015  (JP) .................................. 2015-117168

(51) Int. Cl.
*H01M 2/00* (2006.01)
*H01M 2/02* (2006.01)
(Continued)

(52) U.S. Cl.
CPC ........... *H01M 2/206* (2013.01); *H01M 2/305* (2013.01); *H01M 2/348* (2013.01); *H01M 2200/103* (2013.01); *H01M 2220/20* (2013.01)

(58) Field of Classification Search
CPC ....................................................... H01M 2/02
(Continued)

(56) References Cited

U.S. PATENT DOCUMENTS 6,111,387 A    8/2000  Kouzu et al.
6,211,645 B1   4/2001  Kouzu et al.
(Continued)

FOREIGN PATENT DOCUMENTS

CN    1296298 A      5/2001
JP    10-270006 A    10/1998
(Continued)

OTHER PUBLICATIONS

Japanese Office Action for the related Japanese Patent Application No. 2015-117168 dated May 30, 2017.
(Continued)

*Primary Examiner* — Jonathan G Leong
*Assistant Examiner* — Julian Anthony
(74) *Attorney, Agent, or Firm* — Kenealy Vaidya LLP

(57) ABSTRACT

A wiring module that is used in a battery assembly in which a columnar positive electrode and a columnar negative electrode of a plurality of batteries formed in a thin-type rectangular parallelepiped shape are arranged alternately. The wiring module includes a terminal pattern on a surface of an insulating resin substrate connected to the columnar positive electrode and the columnar negative electrode; a voltage detection wiring pattern on the surface connected to the terminal pattern; a fuse pattern on the surface interposed in the voltage detection wiring pattern; and an insulating resin layer that covers a peripheral portion of the terminal pattern, the voltage detection wiring pattern, and the fuse pattern are covered with the insulating resin layer A pair of through-holes, into which the columnar positive electrode and the columnar negative electrode are inserted, is formed in the terminal pattern and the insulating resin substrate.

5 Claims, 6 Drawing Sheets

(51) Int. Cl.
  *H01M 2/20* (2006.01)
  *H01M 2/30* (2006.01)
  *H01M 2/34* (2006.01)
(58) Field of Classification Search
  USPC .......................................................... 429/170
  See application file for complete search history.

(56) References Cited

U.S. PATENT DOCUMENTS

| | | | |
|---|---|---|---|
| 6,211,646 B1 | 4/2001 | Kouzu et al. | |
| 6,261,719 B1* | 7/2001 | Ikeda .................... | H01M 2/202 |
| | | | 429/120 |
| 2012/0125447 A1* | 5/2012 | Fuhr ................... | H01M 2/0262 |
| | | | 137/260 |
| 2012/0164495 A1* | 6/2012 | Sumida ............... | H01M 2/0404 |
| | | | 429/56 |
| 2013/0280959 A1 | 10/2013 | Takase et al. | |

FOREIGN PATENT DOCUMENTS

| | | |
|---|---|---|
| JP | 2010-205509 A | 9/2010 |
| JP | 2012-199007 A | 10/2012 |

OTHER PUBLICATIONS

Chinese Office Action for the related Chinese Patent Application No. 201610409257.1 dated Apr. 17, 2018.
Chinese Office Action for the related Chinese Patent Application No. 201610409257.1 dated Nov. 1, 2018.

\* cited by examiner

WIRING MODULE

CROSS REFERENCE TO RELATED APPLICATION

This application is based on Japanese Patent Application (No. 2015-117168) filed on Jun. 10, 2015, the contents of which are incorporated herein by reference. Also, all the references cited herein are incorporated as a whole.

BACKGROUND OF THE INVENTION

1. Technical Field

The present invention relates to a wiring module, and particularly, to a wiring module that is suitable for a battery assembly that is formed by connecting a plurality of thin-type batteries in series.

2. Background Art

For example, Patent Document 1 discloses a battery assembly as a power supply that drives an electric motor of a hybrid car or an electric vehicle. In the battery assembly, a plurality of thin-type rectangular parallelepiped unit batteries (hereinafter, simply referred to as "batteries") are arranged to be adjacent to each other in a short-side direction, and an electrode of each of the batteries is provided on a top surface or a lateral surface thereof. Typically, in a case where an electrode is provided on the top surface of the battery, a positive electrode and a negative electrode are separately provided on both end sides in a long-side direction, and in a case where an electrode is provided on the lateral surface of the battery, the positive electrode and the negative electrode are provided on upper portions of lateral surfaces which are opposite to each other. The positive electrode and the negative electrode of the battery formed as described above are arranged alternately, and the positive electrode and the negative electrode of batteries, which are adjacent to each other, are connected in series by using a connection terminal called a bus bar, thereby forming the battery assembly.

In addition, with regard to a voltage of each of the batteries in the battery assembly, a voltage detection wiring of which a terminal is compressed is connected to each connection terminal, and the other end of the voltage detection wiring is connected to a battery controller to detect a voltage of each unit battery, and to perform control of charging of the battery assembly, and the like. A plurality of the voltage detection wirings constitute a wire harness to attain efficiency in wiring work, and to attain space saving, and a reduction in the weight and the cost of the wiring.

Patent Document 1 is JP-A-2012-199007.

SUMMARY OF THE INVENTION

However, as described in Patent Document 1, it is necessary for the battery assembly to include a plurality of wiring components including a plurality of bus bars (connection terminals) for connection between the plurality of batteries, the plurality of voltage detection wirings for detection of the voltage of the respective batteries, and a plurality of crimping terminals which respectively connect the voltage detection wirings to the bus bars. As illustrated in the Patent Document 1, in the assembly work of the wiring component to the battery assembly, time is taken in proportion to the number of series of the batteries. Accordingly, Patent Document 1 suggests that adjacent bus bars are connected to each other through an insulating member and are retained in the insulating member for simplification in mounting work of the plurality of bus bars.

However, according to a technology described in Patent Document 1, the bus bars, the voltage detection wirings, and the crimping terminals are assembled as individual components, and thus there is room for simplification in the assembly work of the wiring components to the battery assembly.

An object of the invention is to provide a wiring module capable of further simplifying assembly work of a wiring component to a battery assembly.

To solve the above-described problem, according to an aspect of the invention, there is provided a wiring module that is used in a battery assembly in which a columnar positive electrode and a columnar negative electrode of a plurality of batteries formed in a thin-type rectangular parallelepiped shape are arranged alternately, the wiring module including: an insulating resin substrate; a terminal pattern that is provided on one surface of the insulating resin substrate and is connected to the columnar positive electrode and the columnar negative electrode of the batteries which are adjacent to each other; a voltage detection wiring pattern that is formed on the one surface and is connected to the terminal pattern; a fuse pattern that is formed on the one surface and is interposed in a part of the voltage detection wiring pattern, and an insulating resin layer that covers a peripheral portion of the terminal pattern, the voltage detection wiring pattern, and the fuse pattern are covered with the insulating resin layer, in which a pair of through-holes, into which the columnar positive electrode and the columnar negative electrode of the batteries are inserted, is formed in the terminal pattern and the insulating resin substrate.

That is, in the invention, the terminal pattern that is connected to the electrodes of the batteries, the voltage detection wiring pattern that is connected to the terminal pattern, and a fuse pattern 4 are integrally formed on the insulating resin substrate in correspondence with the battery assembly. According to this, a crimping terminal, which connects the voltage detection wiring to the terminal pattern, is not necessary, and thus it is possible to collect a plurality of wiring patterns necessary for the battery assembly as one component. According to this, it is possible to further simplify assembly work of a wiring component which is necessary for the battery assembly. In addition, it is possible to realize space saving, a reduction in the weight and the cost of the wiring.

In the invention, the insulating resin substrate may be formed in a strip shape in correspondence with an arrangement direction of the battery assembly, and the terminal pattern may be formed as an overhang portion, which overhangs from a strip-shaped lateral edge of the insulating resin substrate, in a setting number. In addition, it is preferable that one wiring module is formed in correspondence with, for example, a plurality of (for example, 2 to 4) terminal patterns. According to this, it is possible to suppress the maximum value of a strip width of the strip-shaped wiring module. In addition, in a case where the number of series of the batteries is great, a plurality of the wiring modules may be used in an overlapping manner. However, the wiring module of the invention is not limited thereto, and one wiring module may be formed in correspondence with all terminal patterns.

In addition, a fuse pattern 4 is formed in a voltage detection wiring pattern 5. For example, in a case where it is necessary to insert a fuse in the middle of the voltage detection wiring for connection, it is necessary to pass through a fuse box, in which the fuse is accommodated, and the like. However, according to the invention, the fuse pattern is assembled to apart of the voltage detection wiring pattern, and thus it is possible to further contribute to space saving, and a reduction in the weight and the cost of the wiring. In addition, in the fuse pattern, a cross-sectional area and a length of a conductive material and the like may be set so that the fuse pattern is fused when a current equal to or greater than a setting value flows therethrough.

In addition, the wiring module of the invention may further include an auxiliary conductive plate that is arranged to overlap an exposed surface of the terminal pattern which is not covered with the insulating resin layer, and a protective resin layer that surrounds an outer periphery of a lateral surface of the auxiliary conductive plate, and covers the insulating resin layer in a setting region including the peripheral portion of the terminal pattern. According to this, it is possible to adjust an actual current capacity of the terminal pattern of the wiring module in an arbitrary manner in conformity to a current capacity of the battery assembly.

According to the invention, it is possible to further simplify assembly work of a wiring component which is necessary for a battery assembly.

DETAILED DESCRIPTION OF THE EXEMPLARY EMBODIMENTS

Hereinafter, the invention will be described on the basis of Examples.

Example 1

Figure 1A:
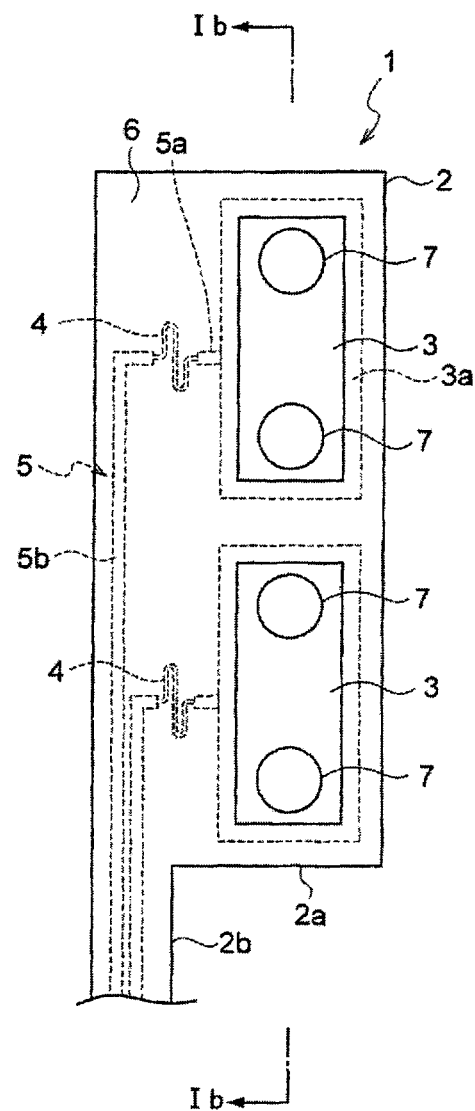
FIGS. 1A and 1B illustrate configuration diagrams of Example 1 of a wiring module of the invention.
Figure 1B:
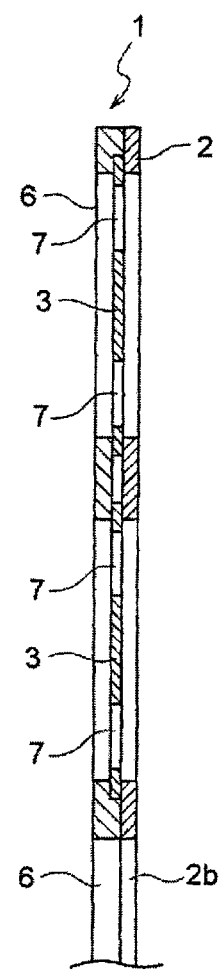

FIGS. 1A and 1B illustrate configuration diagrams of Example 1 of the wiring module of the invention. FIG. 1A is a plan view of a wiring module 1, and FIG. 1B is a cross-sectional view taken along arrow Ib-Ib in FIG. 1A. As illustrated in the drawings, the wiring module 1 includes an insulating resin substrate 2 having an elongated strip shape. A plurality of terminal patterns 3 which are formed from a conductive material and constitute, for example, a bus bar pattern, and a plurality of voltage detection wiring patterns 5, each of which including a fuse pattern 4, are formed on one surface of the insulating resin substrate 2. In addition, the insulating resin substrate 2 is removed from or is not formed at a portion of each of the terminal patterns 3 excluding a peripheral portion 3a thereof. According to this, as illustrated in FIG. 1B, a portion of the terminal pattern 3 other than the peripheral portion 3a is exposed. In addition, an exposed portion of the terminal pattern 3 on an insulating resin substrate 2 side is not limited to this example, and as described in the following modification example to be described with reference to FIG. 6, only a circular region, in which a nut that is bolt-fastened to a counter terminal such as a counter electrode can be screwed, may be exposed. The counter electrode is electrically connected to the terminal pattern 3. On the other hand, a peripheral portion 3a of the terminal pattern 3, the fuse pattern 4, and the voltage detection wiring pattern 5 on the one surface of the insulating resin substrate 2 are covered with an insulating resin layer 6. That is, a portion of the terminal pattern 3 other than the peripheral portion 3a is exposed. According to this, the terminal pattern 3 is brought into contact with a positive electrode of an adjacent battery and a negative electrode of another adjacent battery for connection between the positive electrode and the negative electrode.

Figure 2A:
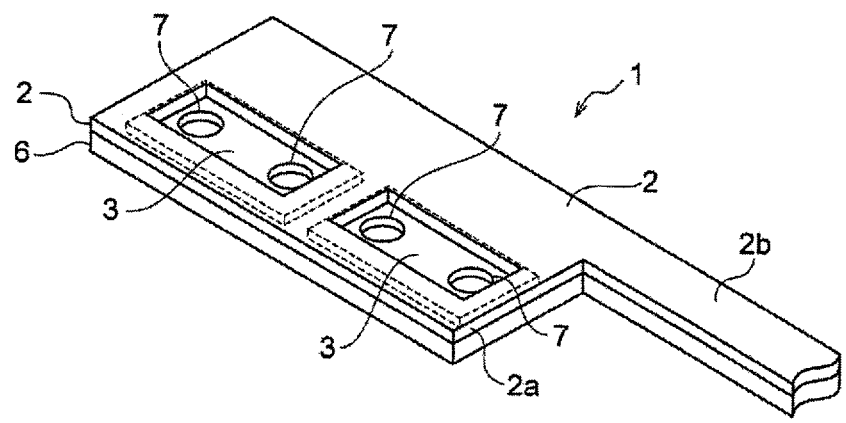
FIGS. 2A and 2B illustrate an embodiment of the battery assembly to which the wiring module of Example 1 is applied.
Figure 2B:
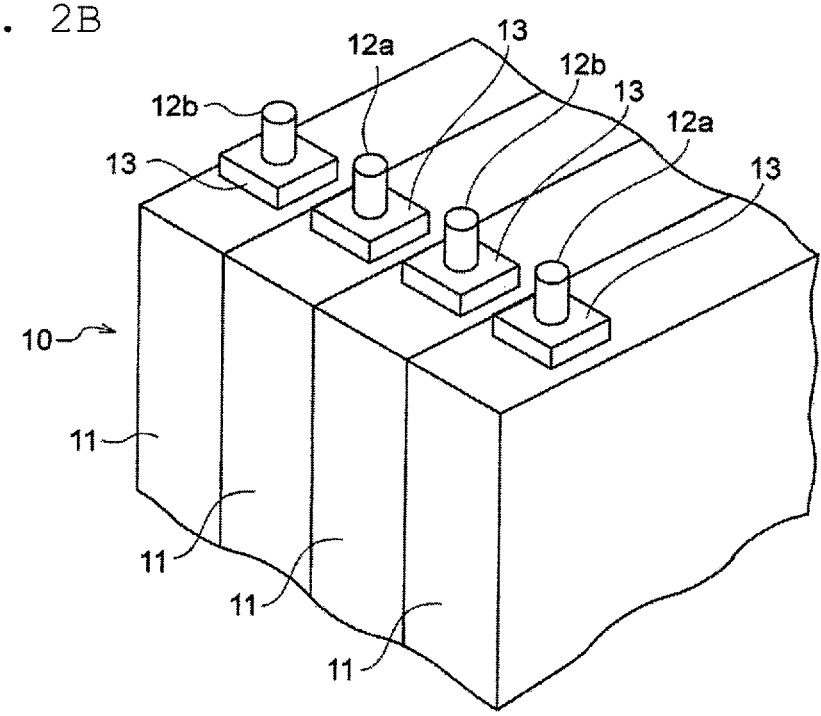

FIGS. 2A and 2B are perspective views for illustrating a battery assembly 10 of one embodiment to which the wiring module 1 of Example 1 is applied. FIG. 2A is a perspective view of the wiring module 1, and FIG. 2B is a perspective view of a main portion of the battery assembly 10. In the battery assembly 10, a columnar positive electrode (hereinafter, simply referred to as "positive electrode") 12a and a columnar negative electrode (hereinafter, simply referred to as "negative electrode") 12b of a plurality of batteries 11 which are formed in a thin-type rectangular parallelepiped shape are arranged alternately. The positive electrode 12a and the negative electrode 12b of the respective batteries 11 are provided to protrude from a stage 13 that is provided on a top surface of each of the batteries 11. In addition, although not illustrated, a screw, to which a nut (not illustrated) is capable of being screwed, is formed on an outer peripheral surface of the columnar electrodes.

A plurality of (two in an example illustrated in the drawing) the terminal patterns 3 are formed at even intervals along one side in a longitudinal direction of the wiring module 1 in a state in which two adjacent the batteries 11 of the battery assembly 10 are set as a unit. As illustrated in FIG. 1, a plurality of through-holes 7, which are arranged in a row along the longitudinal direction of the wiring module 1, are formed in the plurality of terminal patterns 3. Each of the through-holes 7 is formed to pass through exposed portion of both surfaces of each of the terminal patterns 3.

A plurality of the fuse patterns 4 are formed in correspondence with the terminal patterns 3, and one end of each of the fuse patterns 4 is connected to each of the terminal patterns 3 through a first voltage detection wiring pattern 5a, and the other end is connected to a second voltage detection wiring pattern 5b. Each of the plurality of fuse patterns 4 is formed to extend in a short direction of the insulating resin substrate 2 in correspondence with the terminal pattern 3, and the second voltage detection wiring pattern 5b is formed to extend along a longitudinal direction of the insulating resin substrate 2. According to this, it is possible to reduce the width of the wiring module 1. In addition, in the fuse pattern 4, a cross-sectional area and a length of a conductive material are set so that the fuse pattern 4 is fused when a current equal to or greater than a setting value flows therethrough. That is, the cross-sectional area of the fuse pattern 4 is adjusted in accordance with the thickness and the width, and the length of the fuse pattern 4 is set through adjustment in accordance with a curved length as illustrated in the drawing.

Figure 3:
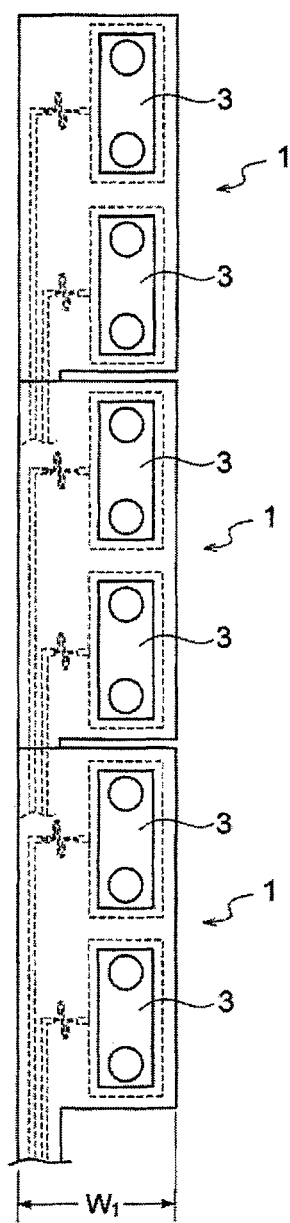
FIG. 3 is a diagram illustrating a method of using the wiring module of Example 1 in the battery assembly in FIG. 2.

The voltage detection wiring pattern 5, in which the fuse pattern 4 is interposed, detects a voltage of the battery 11, and is formed to extend along a side in the longitudinal direction of the wiring module 1 which is opposite to the terminal pattern 3. The other end of the voltage detection wiring pattern 5 (the second voltage detection wiring pattern 5b) is connected to a battery controller (not illustrated) through a connector and the like. In addition, in Example 1, two terminal patterns 3 and the voltage detection wiring pattern 5 including two fuse patterns 4 are formed in one wiring module 1, but the invention is not limited thereto. Three or greater terminal patterns 3, and the voltage detection wiring pattern 5 including three or greater fuse patterns 4 may be formed. In addition, in a case where the number of series of batteries is great, as illustrated in FIG. 3, a plurality sheets of the wiring modules 1 may be used in an overlapping manner to cope with the above-described case.

The through-holes 7, into which the positive electrode 12a and the negative electrode 12b of adjacent batteries 11 are inserted, are punched in the terminal pattern 3 of the wiring module 1. According to this, in a case of applying the wiring module 1 of Example 1, the positive electrode 12a and the negative electrode 12b are inserted into the through-holes 7, respectively, in a state in which an exposed surface on an insulating resin layer 6 side of the terminal pattern 3 is set as a lower surface side as illustrated in FIG. 2. In addition, the exposed surface of the terminal pattern 3 is brought into contact with the stages 13 of the positive electrode 12a and the negative electrode 12b, and is fixed thereto through nut-fastening from an exposed surface side of the terminal pattern 3 on the insulating resin substrate 2 side. At this time, the terminal patterns 3 and the through-holes 7 of the wiring module 1 are formed in a row. Accordingly, when the through-hole 7 of one terminal pattern 3 is aligned to one positive electrode 12a or negative electrode 12b, a position of the through-hole 7 of another terminal pattern 3 can be aligned to a corresponding positive electrode 12a or negative electrode 12b. In addition, it is preferable that a margin is provided in a hole diameter of the through-hole 7, or the through-hole 7 is formed as a long hole in consideration of an arrangement error of the plurality of batteries 11, a distance tolerance of the positive electrode 12a or the negative electrode 12b, and a manufacturing error.

As described above, according to Example 1, the plurality of terminal patterns 3 and the plurality of voltage detection wiring patterns 5 including the fuse pattern 4, which were individual components in the related art, are formed as one wiring module 1. According to this, it is possible to simplify assembly work to the battery assembly 10. Particularly, it is possible to significantly reduce work such as retention of the plurality of terminal patterns 3 through an insulating member, and insertion of the positive electrode 12a or the negative electrode 12b of the batteries 11 into the plurality of terminal patterns 3 after alignment therebetween.

In addition, it is possible to minimize a space necessary for connection of a crimping terminal to the voltage detection wiring. In addition, the crimping terminal is not necessary, and thus a reduction in weight can be attained. In addition, it is possible to significantly reduce work necessary for connection between the fuse and the voltage detection wiring, and it is possible to realize a reduction in the cost. In other words, it is possible to form the voltage detection wiring including the fuse in a compact manner. In addition, it is possible to provide a wiring module in which assemblability is improved and which is excellent in assembly workability.

In addition, typically, in a case where the fuse is interposed in the middle of the voltage detection wiring, it is necessary for the voltage detection wiring to be interconnected via a fuse box, in which the fuse is accommodated, and the like. When considering the above-described circumstances, according to Example 1, since the fuse pattern can be assembled to a part of the voltage detection wiring pattern, it is possible to further contribute to space saving, and a reduction in the weight and the cost of the wiring. In addition, it is not necessary to provide the fuse pattern 4 to the wiring module 1. A fuse function corresponding to the fuse pattern 4 may be provided to the battery controller.

In addition, in Example 1, the wiring module 1 may be formed as a so-called flexible printed circuit (FPC) in which the terminal pattern 3 and the voltage detection wiring pattern 5 including the fuse pattern 4 are formed on the insulating resin substrate 2, which is formed by using a flexible material, as a pattern through deposition and the like. According to this, it is possible to provide a wiring member which is thin, is likely to be bent, and is easy to handle.

However, the invention is not limited thereto, and as the insulating resin substrate 2, a material having certain hardness may be used. In addition, in a terminal pattern region 2a of the wiring module 1 in which the terminal pattern 3 is formed, a region excluding the exposed portion of the terminal pattern 3 may be molded with a resin.

Example 2

Figure 4:
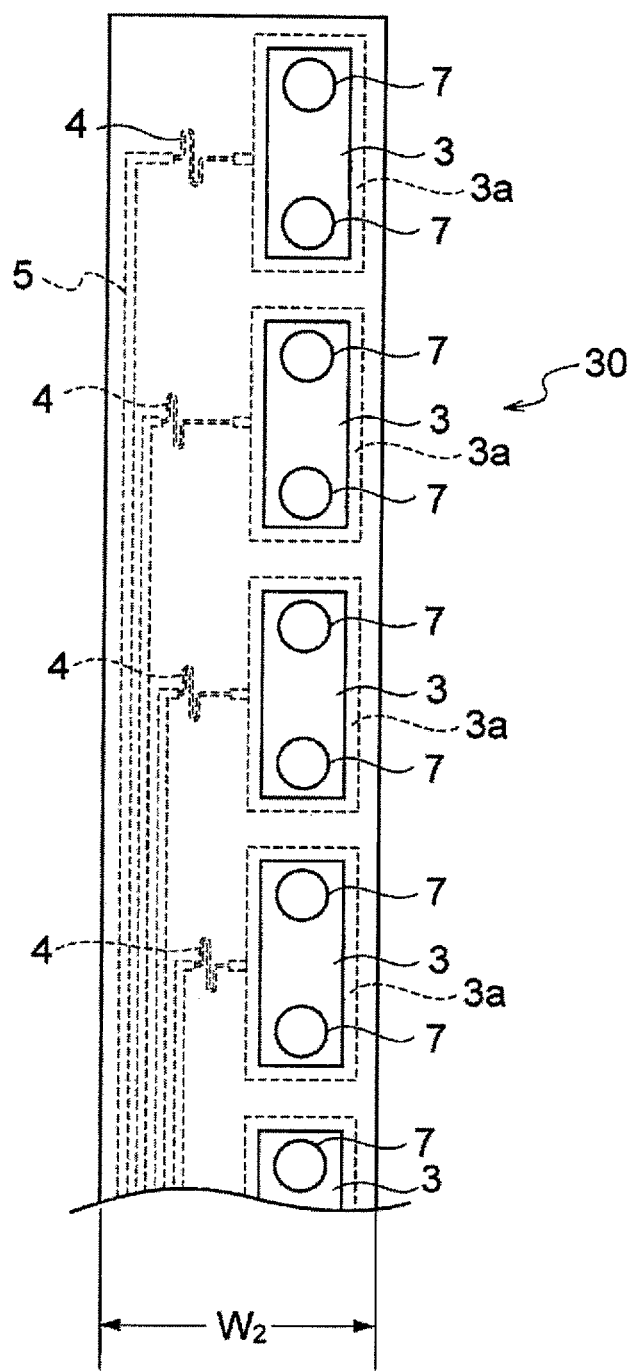
FIG. 4 is a configuration diagram of Example 2 of the wiring module of the invention.

FIG. 4 is a plan view of Example 2 of the wiring module of the invention. A wiring module 30 of this example are the same as Example 1 in that terminal patterns 3 are arranged at even intervals in a state in which two adjacent batteries 11 of a battery assembly 10 are set as a unit. A difference from Example 1 is that the terminal patterns 3 are provided in a number of 5 or greater, for example, the terminal patterns 3 are provided in number corresponding to the number of all series of the batteries 11 to form one piece of the wiring module 30. The other configurations are the same as in Example 1, and thus the same reference numerals will be given thereto, and description thereof will not be repeated.

According to Example 2, it is possible to reduce the number of the wiring module 30 necessary for the battery assembly 10 in comparison to Example 1. However, as illustrated in FIG. 4, the entire width $W_2$ of the wiring module 30 increases. Accordingly, a restriction on the entire width $W_2$ may be imposed depending on a configuration of the battery assembly 10. In contrast, according to Example 1, as illustrated in FIG. 3, the entire width $W_1$ of the wiring module decreases, and thus a restriction depending on the configuration of the battery assembly 10 is less likely to be imposed. In this case, in the wiring module 1, a wiring pattern region 2b, in which the voltage detection wiring pattern 5 is formed, of the wiring module 1 other than the terminal pattern region 2a in which the terminal pattern 3 is formed may be arranged in an overlapping manner as illustrated in FIG. 3.

Example 3

Figure 5:
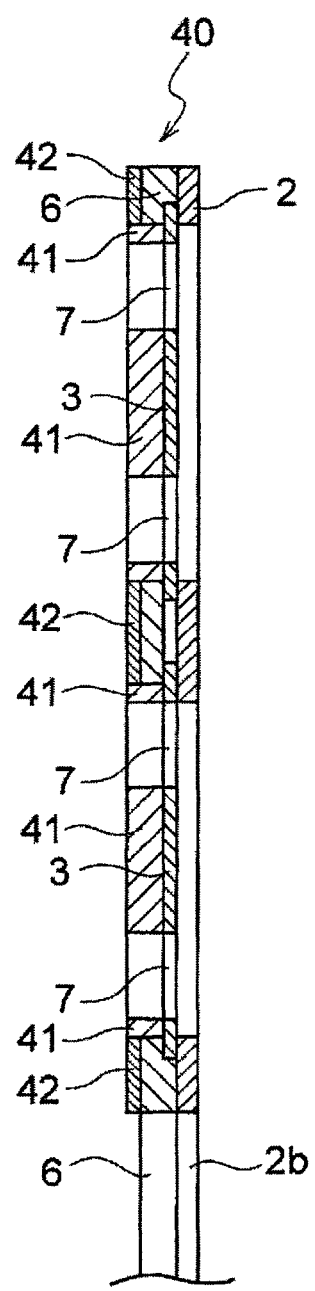
FIG. 5 is a configuration diagram of a main portion of Example 3 of the wiring module of the invention.

FIG. 5 is a cross-sectional view of a main portion of Example 3 of the wiring module of the invention. The cross-sectional view in FIG. 5 is a cross-sectional view corresponding to FIG. 1B. A wiring module 40 of Example 3 is different from Example 1 in that an auxiliary conductive plate 41 is arranged to overlap the exposed surface of the terminal pattern 3 which is not covered with the insulating resin layer 6, and a protective resin layer 42 is formed to surround an outer periphery of a lateral surface of the auxiliary conductive plate 41 and to cover the insulating resin layer 6 in a setting region including the peripheral portion of the terminal pattern 3. According to Example 3, it is possible to adjust an actual current capacity of the terminal pattern 3 of the wiring module 40 in an arbitrary manner in conformity to a current capacity of the battery assembly 10 through adjustment of the thickness of the auxiliary conductive plate 41. The protective resin layer 42 may be molded with a resin.

Modification Example

Figure 6A:
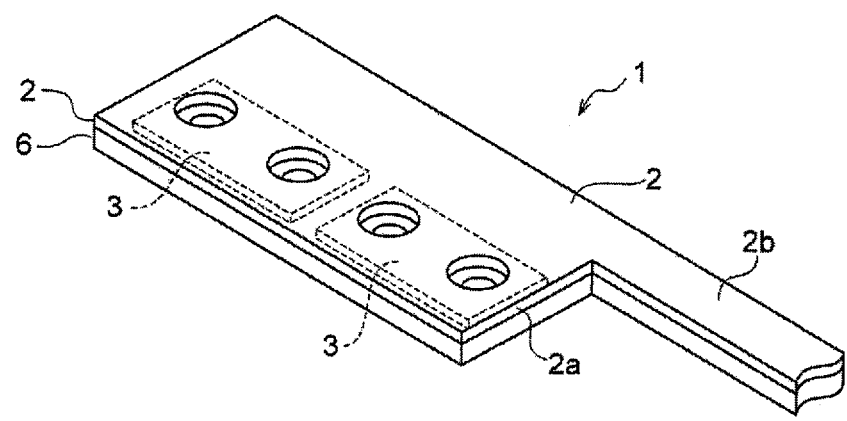
FIGS. 6A and 6B illustrate configuration diagrams of a modification example of Example 1 of the wiring module of the invention.
Figure 6B:
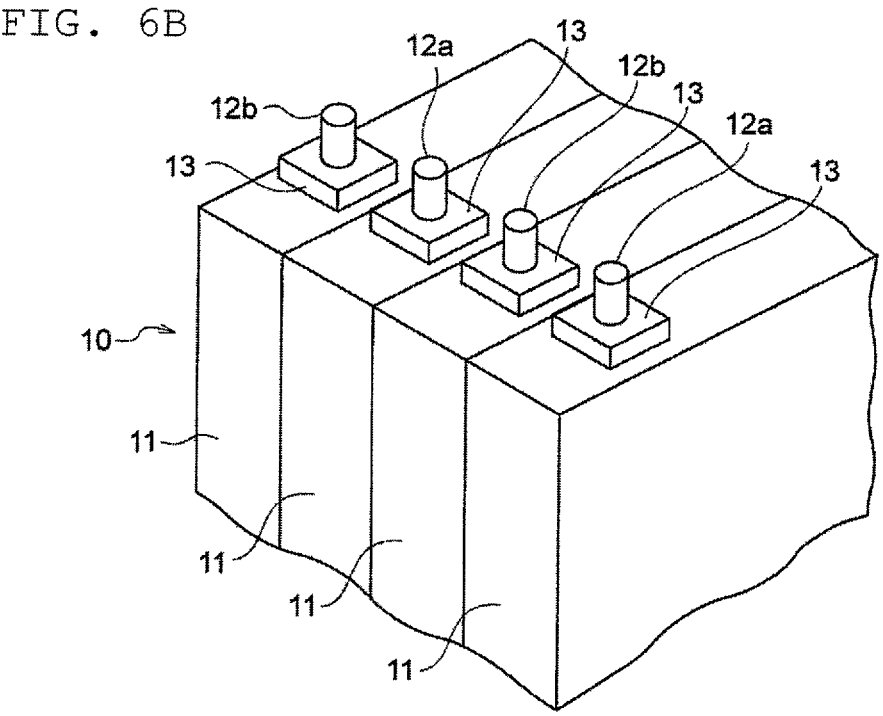

FIGS. 6A and 6B illustrate configuration diagrams of a modification example of the wiring module 1 of Example 1. This modification example is different from the wiring module of FIG. 2A in that a circular region, in which a nut that is bolt-fastened to a counter terminal such as a counter electrode can be screwed, is exposed. The counter electrode is electrically connected to the terminal pattern 3. According to this, a region, in which the peripheral portion of the terminal pattern 3 is covered with the insulating resin substrate 2, increases, and thus it is possible to enlarge a force of retaining the terminal pattern 3 by the insulating resin substrate 2.

Hereinbefore, the invention has been described on the basis of Examples. However, it should be understood by those skilled in the art that the invention is not limited to Examples and can be executed in an aspect in which a modification or a change is made in a known range of the invention, and the modification and the change pertains to claims of this application.

What is claimed is:

1. A wiring module that is used in a battery assembly in which a columnar positive electrode and a columnar negative electrode of a plurality of batteries formed in a rectangular parallelepiped shape are arranged alternately, the wiring module comprising:
   an insulating resin substrate;
   a terminal pattern that is provided on one surface of the insulating resin substrate and is connected to the columnar positive electrode and the columnar negative electrode of the batteries which are adjacent to each other;
   a voltage detection wiring pattern that is formed on the one surface and is connected to the terminal pattern at a connecting portion;
   a fuse pattern that is formed on the one surface and is interposed in a part of the voltage detection wiring pattern; and
   an insulating resin layer that completely covers a peripheral portion of the terminal pattern, an entirety of the voltage detection wiring pattern at the connecting portion, and an entirety of the fuse pattern such that the peripheral portion of the terminal pattern, the entirety of the voltage detection wiring pattern at the connecting portion, and the entirety of the fuse pattern are set in the insulating resin layer,
   wherein a pair of through-holes, into which the columnar positive electrode and the columnar negative electrode of the batteries are inserted, is formed in the terminal pattern and the insulating resin substrate.

2. The wiring module according to claim 1,
   wherein the insulating resin substrate is formed in a strip shape in correspondence with an arrangement direction of the battery assembly, and
   the terminal pattern is formed as an overhang portion that overhangs from a strip-shaped lateral edge of the insulating resin substrate.

3. The wiring module according to claim 1, further comprising:
   an auxiliary conductive plate that is arranged to overlap an exposed surface of the terminal pattern which is not covered with the insulating resin layer; and
   a protective resin layer that surrounds an outer periphery of a lateral surface of the auxiliary conductive plate, and covers the insulating resin layer in a region including the peripheral portion of the terminal pattern.

4. The wiring module according to claim 1, wherein the terminal pattern that is connected to the electrodes of the batteries, the voltage detection wiring pattern that is connected to the terminal pattern, and the fuse pattern are integrally formed on the insulating resin substrate.

5. The wiring module according to claim 4, wherein the voltage detection wiring pattern is connected to the terminal pattern as one component without crimping.

* * * * *